United States Patent
Rubio et al.

(10) Patent No.: US 6,322,836 B1
(45) Date of Patent: Nov. 27, 2001

(54) CONTINUOUS PRODUCTION OF AN INSTANT CORN FLOUR FOR AREPA AND TORTILLA, USING AN ACID-COOKING

(76) Inventors: Manuel J. Rubio, 1621 Collins Ave., Miami Beach, FL (US) 33139; Roberto Contreras, R. Cortines 2002, Ote. Guadalupe, N.L. (MX); Francisco Arroyo, 501 W. Chapin Rd., Edinburg, TX (US) 78539

( * ) Notice: Subject to any disclaimer, the term of this patent is extended or adjusted under 35 U.S.C. 154(b) by 0 days.

(21) Appl. No.: 09/764,280

(22) Filed: Jan. 19, 2001

(51) Int. Cl.[7] ........................................... A23L 1/00
(52) U.S. Cl. ..................... 426/508; 426/463; 426/464; 426/622; 426/626
(58) Field of Search ................................. 426/508, 463, 426/464, 618, 622, 626, 482

(56) References Cited

U.S. PATENT DOCUMENTS

| | | | |
|---|---|---|---|
| 1,045,490 | * 11/1912 | Wulkan | 426/626 |
| 5,176,931 | * 1/1993 | Herbster | 426/626 |
| 6,025,011 | * 2/2000 | Wilkinson et al. | 426/626 |

* cited by examiner

Primary Examiner—George C. Yeung
(74) Attorney, Agent, or Firm—Young & Thompson

(57) ABSTRACT

Precooked and partially-dehulled corn flour is produced using an acid-cooking in a continuous process, by acid-precooking to effect corn hull hydrolysis with sodium metabisulfite or sodium hydrogen sulfite or sodium sulfite, with reduced kernel washing and solid loss. Moisture content is then stabilized, followed by grinding and drying in a superheated stream of air, cooling and further drying the dried-ground particle. A fine grind or flour is separated and recovered from the coarse grind which is also segregated to isolate a hull fraction as corn hull waste, regrinding and sieving the coarse grind to produce an instant corn flour for arepa, and admixing the fine grind with lime to obtain a masa flour for tortilla and the like.

9 Claims, 1 Drawing Sheet

CONTINUOUS PRODUCTION OF AN INSTANT CORN FLOUR FOR AREPA AND TORTILLA, USING AN ACID-COOKING

BACKGROUND OF INVENTION

1. Field of the Invention

The present invention relates to an accelerated thermal process under acidic cooking for the production of precooked corn flour and, more particularly, it relates to a continuous partial removal of the corn hull fraction with an acidic reducing agent applied to the production of instant corn flour for the manufacture of arepa and tortilla and the like.

2. Description of Related Art

Tortilla and corn dough (masa) are traditionally made from whole corn kernel which is cooked and/or stepped in calcium hydroxide (lime) or sometimes in sodium hydroxide (lye) or wood ashes, in order to produce a reaction known as "nixtamalization". The nixtamalized corn is further steeped, washed with partial hull removal and finally stone ground into a corn dough. Corn dough texture is determined by factors such as corn variety or cultivar, endosperm hardness as well as the water uptake (dough yield) and degree of starch gelatinization mainly during corn "cooking" (thermal) and cooked corn (nixtamal) "grinding" (mechanical) operations.

During alkali-cooking and/or steeping, there are chemical and physical changes such as nutrient losses along with partial hull removal and gelatinization in the corn kernel. The most important nutritional modifications are: an increase in the calcium level with improvements in the Ca to P ratio, a decrease in insoluble dietary fiber and zein-protein, a significant reduction in thiamin and riboflavin, an improvement of the leucine to isoleucine ratio reducing the requirement for niacin and reduction of the aflatoxins by leaching into the lime-water.

The cooking method, raw corn quality and cooker-type (batch or continuous) used have been proposed as the critical variables which determine solid losses in lime-water residue (nejayote). This wastewater by-product was composed of corn solids ranging from 1.5% (batch-cooker) to 2.5% (continuous-cooker). Dry solid matter includes an average of 50–60% dietary fiber, 15–20% ash, 15% starch, 5–10 % protein and 5% fat. The corn pericarp makes up 4–6% of the kernel dry weight (Watson, 1987), It also contains 67% hemicellulose, 23% cellulose and 0.6% soluble-fiber. It is estimated that dietary fiber in the pericarp (4.9%) and endosperm (2.6%) make up 80% of the total dietary fiber (9.5% in a dry-weight basis).

During the formation of corn dough, grinding disrupts the swollen and partially gelatinized starch granules and further distributes the hydrated soluble starch, protein and fiber fractions around the ungelatinized fraction of the endosperm-germ granules.

Tortilla is the main edible corn product in Latin America. It is a flat, round, unleavened and baked thin pancake (flat-cornbread) made from fresh masa or corn dough prepared from industrial nixtamalized corn flour (masa flour). It might be mentioned that tortilla, when manually or mechanically elaborated and without additives of any kind, has a maximum shelf life of 12 to 15 hours at room temperature. Afterwards they are spoiled by microorganisms and become hard or stale (retrogradation) due to a physicochemical change in the starch constituent of either stored or reheated tortilla It is known that tortilla when kept under conditions in which no moisture is lost (plastic package storage), nevertheless become inflexible with time and break or crumble easily when bent.

Properly processed industrial masa flour simplifies the production of tortilla products, because the customer eliminates management techniques required for wastewater treatment, securing, handling and processing corn into masa for tortillas and snacks. However, an instant corn flour potentially has the following quality cost disadvantages: high cost, lack of flavor, and poor texture in tortilla products or snacks prepared from masa flour.

There is nevertheless an increasing demand for and use of industrially prepared corn flours for the benefits they provide to the consumer, such as convenience, availability, incorporation of micronutrients and additives, low price and a more stable product quality (Sustain, 1997). The basic difference between tortilla (from Mexico and some Central American countries) and arepa flour (Venezuela and Colombia) is that for the former, whole corn is alkali-cooked and the hull is partially separated to obtain a lime-precooked corn flour (masa flour). On the other hand, arepa flour (precooked flour) is prepared from dehulled and degerminated corn without using an alkali-cooking treatment (INCAP, 1961). However, arepa flour is further enriched, by Venezuelan law, with B-vitamins and iron to improve the nutritional value of this traditional South American food mainly based on this baked thick pancake (flat-cornbread: Cuevas et al. 1985).

Corn processes can generate added value from their industrial operations in one of three approaches: developing new products from new hybrids, increasing the yield of traditional products from corn, and improving process efficiency at a lower unit cost. In the past, this has been done by methods and apparatus where the grain is cooked and/or steeped in a lime-water solution such as those disclosed in U.S. Pat. Nos. 2,584,893; 3,194,664; 4,326,455 and 4,513,018. These prior art methods for the industrial production of corn dough or masa flour involve accelerated cooking and steeping times with large amounts of solids losses (1.5–2.5%) in the liquid waste. In addition, essential nutrients such as vitamins and some amino acids are lost, depending on the severity of the cooking and washing operations.

Many and varied methods for the production of instant corn flour for tortilla involving reduced amounts of water with short process times and low energy requirements for a high yield of the end product have been developed, as reflected by the following U.S. Pat. Nos. 4,250,802; 4,329,371; 4,594,260 and 5,532,013. Although the above described prior art methods are capable of producing corn flour with increasing yields and processing efficiencies, a continuous process was still unavailable in the expanding masa flour industry for tortilla and the like.

SUMMARY AND OBJECTS OF THE INVENTION

Accordingly, it is an object of this invention to provide a novel method and apparatus for continuous production of an instant corn flour under processing conditions involving not only a reduced amount of water and solids loss but also an increased yield of the product.

Another object is to achieve this objective using an acidic cooking with sodium metabisulfite and the like for partial removal of the hull fraction and producing a precooked corn flour for arepa and tortilla and the like.

The above and other objects and advantages of the invention are achieved by a new continuous process applied to the production of precooked corn flour or instant corn flour for arepa and tortilla, embodiments of which include acid-precooking with a sodium metabisulfite, or sodium hydrogen sulfite or sodium sulfite solution so as to effect corn hull hydrolysis, reduced washing of precooked kernel, stabilization of the moisture content to a desired optimum level for grinding, grinding and drying the preconditioned kernel to produce a uniform partial cooking, cooling and drying the dry-ground particle, separating and recovering the fine grind so produced from the coarse grind while the latter is further aspirated to remove a hull fraction as corn waste, regrinding the isolated coarse grind and further sieving it to obtain an instant corn flour for arepa, and admixing only a fine flour with lime to produce masa flour for tortilla and derivatives thereof.

BRIEF DESCRIPTION OF THE DRAWING

The invention will be more fully understood from the description which follows and from the appended drawing in which.

DETAILED DESCRIPTION OF THE PREFERRED EMBODIMENTS

Figure 1:
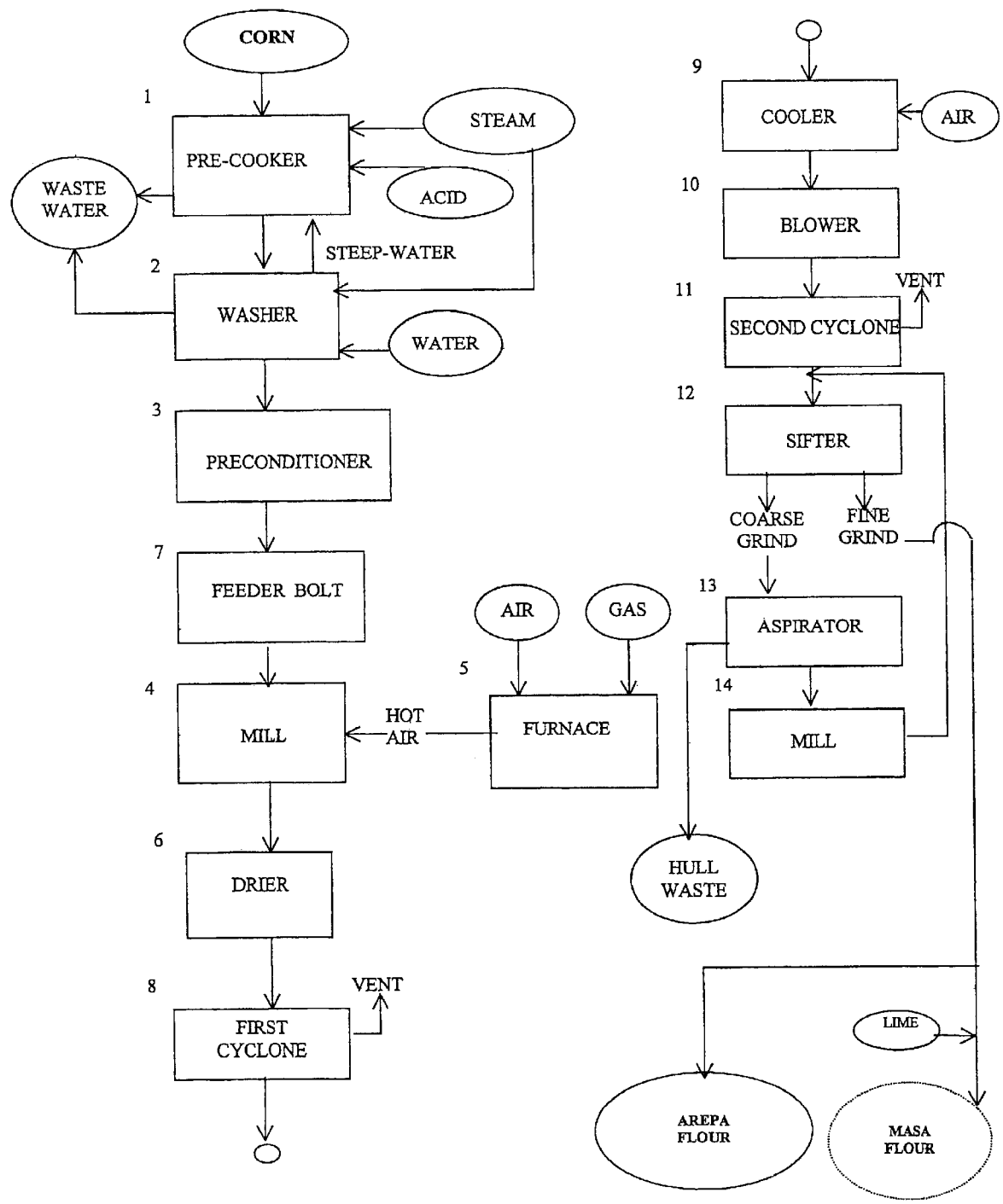
FIG. 1 depicts an embodiment of this invention in a block-type flowchart illustrating the continuous process.

Referring first to FIG. 1, there is depicted, in flowchart form, an embodiment of the present invention. It includes a pre-cooker 1; a washer 2; a preconditioner 3; a primary mill 4 with an associated furnace 5; a dryer 6; a feeder bolt 7; a first cyclone separator 8; a cooler 9 with an associated blower 10; a second cyclone separator 11; a sifter 12; a series of aspirators 13; and a secondary mill 14.

The pre-cooker 1 is fed with corn and a sodium metabisulfite solution, to form an acidic aqueous suspension which is heated by steam injection. By regulating the steam heating along with the kernel residence time, it is possible to precook the corn to a temperature of from about 75° to about 94° C. for a period of 35 to 45 minutes. This allows the precooked kernel to be produced at moisture contents of between 35% and 37%, while the pH is lowered to about 6.2–6.6 with the addition of a 10% acidic solution to supply a 0.16% sulfite-additive with respect to corn. Water loss in the process is replaced with wash water from the washer 2, which is regulated to maintain the solid content of the solution at about 0.6% to 0.7%. The pre-cooker performs a partial acidic hydrolysis that promotes a uniform diffusion of the cooking water through the tip cap into the germ, endosperm and their cell walls made of dietary fiber. Acid-cooking also softens the corn, permitting a 70% reduction in waste solids as well as a 15% reduced wastewater overflow (with a concomitant lower sewage cost) compared to the industrially used alkali-cooking (Alvarez and Ramirez, 1995).

The partially cooked corn suspension is then passed to a washer 2 where it is sprayed with steam heated water at a temperature of about 60° to 70° C. for 30 to 60 seconds, which also serves to wash off excess waste solids.

The washed corn is thereafter passed to a preconditioner 3, where the kernel is equilibrated to obtain a residual moisture content of 38%–39% for 150–210 minutes.

Thereafter, the preconditioned particle is fed to a primary mill 4 by feeder bolt 7. The mill 4 has an associated specially designed venturi such that the premilled corn and hot air coming from a furnace 5, is mixed and partially cooked by a dryer 6 whose design is known per se. The premilled kernel is thereby dried at a higher temperature and short time, and is partially gelatinized or precooked to yield a moisture content of 12% to 14% depending on the granulation being produced.

Moisture laden-hot air (195° C. to 205° C.) is extracted with a first cyclone separator 8 so that further moisture extraction may take place by impelling the drier material through a cooler 9 with air sucked by the blower 10, thus further decreasing the moisture content from 12–14% to about 11–12% (similar to the incoming corn).

After further extraction of moisture laden-warm air with a second cyclone separator 11, the precooked dry particle is directed to a sifter 12 where the fine grind is discharged as instant corn flour for arepa and the coarse grind is further segregated in a series of aspirators 13. The former fine grind may be admixed with lime (0.3% based on flour) for production of instant masa flour for tortilla or snack foods.

The latter coarse grind particle is further separated in the aspirator system 13 wherein two fractions are obtained, a light hull fraction which is isolated as corn waste with a moisture content between 11% to 13% (representing from about 3% to 6% to about 5% to 10% of the total weight of incoming corn), and a heavy coarse fraction that is milled in a secondary mill 14. The milled product from secondary mill 14 is recycled to the sifter 12 for further sieving and to obtain a homogeneous corn flour for arepa. If desired, the arepa flour can be admixed with lime to produce a masa flour for making tortilla.

For use in arepa manufacture, the instant flour is preferably rehydrated by mixing with warm water from a 1:1.3 to about 1:1.4 weight ratio to form a corn dough for arepa elaboration (53% to 60% final moisture).

For use in tortilla manufacture, the masa flour made from the present method can be rehydrated with water from a 1:1 to about 1:1.3 weight ratio for a masa dough used in tortilla preparation (45% to 49% final moisture).

In this method, the novel acid-cooking results in a 65% to 75% reduction in solid loss and a 15% to 20% reduction in wastewater effluent, with correspondingly lower sewage and energy costs, as compared to the conventional methods. Furthermore, the acid-cooking of the invention allows a 50% reduction in lime use if an instant masa flour were produced to improve the traditional lime flavor and tortilla and/or snack shelf life. The bisulphite and sulfite ions in aqueous solutions not only aid in stopping the growth of putrefactive organisms, but also inhibit browning reactions during the corn preconditioning.

There is furthermore a potential gain in corn flour yield from 88% to 92% of the total weight of acid-cooked corn as compared to the traditional alkali-cooking process which approximately yields from 87% to about 89%. Whereas the precooked and partially dehulled corn flour produced by the present method may thus comprise a higher than 90% average yield of flour per kilogram of corn, the dehulled and degermed flour produced by traditional arepa processing obtains only a 70% average yield.

Still further, the instant corn flour produced by the present method has a higher nutritional value than that produced by the conventional methods, with more protein (15% to 25%), fat (70% minimum), and dietary fiber content (100%) than the typical arepa or cornmeal flour which mainly needs vitamins (B and A) and mineral (iron) fortification.

From the foregoing, it will be apparent that it is possible to manufacture a precooked and partially-dehulled corn flour for arepa and masa flour with a novel continuous process which is efficient because of a reduced solid and wastewater effluent, wherein some of the solid loss that would have been present but for the features of this invention is prevented. The shelf life of tortilla, however, could be improved with refrigeration, antimicrobial agents, fiber-gum antistaling agents, or by adding more than 0.3% lime during cooking or into the corn dough (U.S. Pat. No. 3,730,732) or less washing of the precooked corn.

The following table gives a typical nutrient average composition for an instant corn flour for tortilla, and a South American precooked corn flour for arepa elaboration (NCAP, 1961; Cuevas, 1985):

| Nutritional profile (per 100 g) of Instant Corn Flours | | |
|---|---|---|
| Nutrient | Corn flour | Arepa flour |
| Water (g) | 11.0 | 11.0 |
| Protein (g) | 8.1 | 7.0 |
| Fat (g) | 3.7 | 0.7 |
| Ash (g) | 1.3 | 0.3 |
| Dietary fiber (g) | 6.1 | 3.0 |
| Starch (g) | 69.8 | 78.0 |
| Calories | 356 | 365 |

It is to be understood that the embodiments of this invention herein illustrated and described in detail, are by way of illustration and not of limitation. Other changes and modifications are possible and will present themselves to those skilled in the prior art and by the spirit of the appended claims.

References

U.S. PATENT DOCUMENTS

| | |
|---|---|
| 2,584,893 | 2/1952 Lloyd et al. |
| 3,194,664 | 7/1965 Eytinge |
| 3,730,732 | 5/1973 Rubio |
| 4,250,802 | 2/1981 Rubio |
| 4,326,455 | /1982 Rubio |
| 4,329,371 | /1982 Hart |
| 4,513,018 | 4/1985 Rubio |
| 4,594,260 | 6/1986 Vaqueiro et al. |
| 5,532,013 | 7/1996 Martinez-Bustos et al. |

OTHER PUBLICATIONS

Alvarez, M. M. and Remirez, J. F. 1995. Biodegradative treatment of nixtamalization waters (nejayote). Abstract in Keystone Symposia of Environmental Biotechnology (Journal of Cellular Biochemistry), Silverthorne, Colo. USA.

Cuevas, F., Figueira, E. and Racca, E. 1985. The technology for Industrial production of Precooked Corn Flour in Venezuela. Cereal Foods World. 30(10):707–712.

INCAP, 1961. Food Composition Table for use in Latin America, by: Leung, W. W. and Flores, M. INCAP and NIH-research project, Guatemala City, Guatemala, C.A. (145p.)

Sustain, 1997. A literature and Industry Experience Review, In: Fortification of corn masa flour with Iron and/or other Nutrients, By: Bressani, R., Rooney, L. W. and Serna-Saldivar, S.O. USAID, Washington, D.C., December (165 p.)

Watson, S. A. 1987. Structure and Composition, In: *Corn Chemistry and Technology* Eds. S.A. Watson and P.E. Ramstead, AACC, St. Paul, Minn. USA, pp. 53-78.

We claim:

1. A method of processing corn kernel to produce precooked and partially dehulled corn flour for arepa and tortilla, comprising continuously and repeatedly the following steps:

acid-cooking corn kernel in a solution comprising at least one acid component selected from the group consisting of sodium metabisulfite, sodium hydrogen sulfite and sodium sulfite, to partially hydrolyze the hull of said corn kernel, stabilizing a moisture content of said acid-cooked corn kernel to within a predetermined range, grinding said corn kernel and drying said corn kernel with a high temperature-short time apparatus or flash drier, cooling and drying said ground corn with ambient air having a relatively lower moisture content, separating and recovering said ground corn into a finer fraction, under 25 to 60 mesh, and a coarser fraction that is further aspirated to remove hull by-product and thereafter re-ground, whereby there is produced an instant corn flour with fine particle size suitable for arepa.

2. The method of claim 1 wherein said hull by-product is a light hull fraction representing a minimum by-product yield from 3% to about 5% of the total weight of corn kernel.

3. The method according to claim 1, further comprising recycling the reground coarser fraction by performing said separating and recovering step on the reground coarser fraction.

4. The method for claim 1 wherein said precooked and partially dehulled corn flour comprises an average yield of about 90% flour per kilogram of corn kernel.

5. The method in accordance with claim 1, further comprising rehydrating said instant flour by mixing with warm water from a 1:1.3 to about 1:1.4 weight ratio to form a corn dough for arepa elaboration.

6. The method in accordance with claim 1, further comprising treating said instant corn flour with lime to produce a masa flour.

7. The method according to claim 6, further comprising rehydrating said masa flour with water from a 1:1 to about 1:1.3 weight ratio to form a masa dough used in tortilla preparation.

8. The method of claim 5, wherein the corn dough has a final moisture content of 53% to 60%.

9. The method of claim 7, wherein the masa dough has a final moisture content of 45% to 49.

* * * * *